(No Model.)

J. HOLLINGWORTH.
MILLING MACHINE.

No. 432,529. Patented July 22, 1890.

WITNESSES:
Walter Allen
J. W. Mister

INVENTOR:
James Hollingworth
by Herbert W. T. Jenner.
Attorney.

THE NORRIS PETERS CO., PHOTO-LITHO., WASHINGTON, D. C.

UNITED STATES PATENT OFFICE.

JAMES HOLLINGWORTH, OF DOBCROSS, COUNTY OF YORK, ENGLAND.

MILLING-MACHINE.

SPECIFICATION forming part of Letters Patent No. 432,529, dated July 22, 1890.

Application filed April 8, 1890. Serial No. 347,013. (No model.) Patented in England May 1, 1889, No. 7,236.

*To all whom it may concern:*

Be it known that I, JAMES HOLLINGWORTH, a subject of the Queen of Great Britain, residing at Dobcross, in the county of York, England, have invented certain new and useful Improvements in Milling-Machines for Cutting Metals, (for which I have obtained a patent in Great Britain, No. 7,236, bearing date May 1, 1889;) and I do hereby declare the following to be a full, clear, and exact description of the invention, such as will enable others skilled in the art to which it appertains to make and use the same.

My invention has reference to milling-machines employed for cutting metals. In this class of machine the cutter-spindle is carried at one end by a bracket and at the other end by a fixed radial arm cast to the head-stock of the machine; but such fixed radial arm is an impediment when cutting certain forms and shapes of iron-work. To obviate this, and to make the machine adaptable to act upon different shapes and sizes of metal, I propose to make the radial arm so that it can revolve or oscillate in order to alter its position, and to carry out my invention the radial arm and head-stock are now cast separately and held together by bolts. To do this I form a flange either on the head stock or radial arm, such flange having an annular groove formed in it. I also make a corresponding flange on the end of the other part, and by means of T-headed bolts the radial arm and head-stock are fastened together, the annular groove and T-headed bars permitting the radial arm to be moved and set, as if upon a pivot, to any required angle, according to the shape of metal being operated upon.

Such being the nature and object of my invention, I will now make reference to the accompanying sheet of drawings illustrative thereof, wherein—

Figure 1:
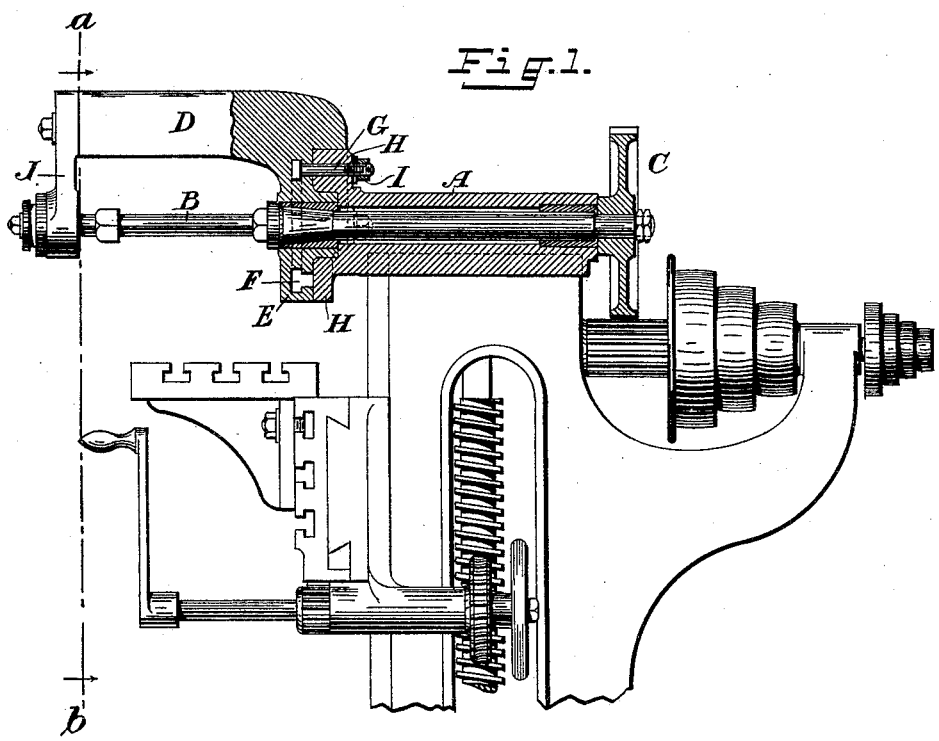
Figure 2:
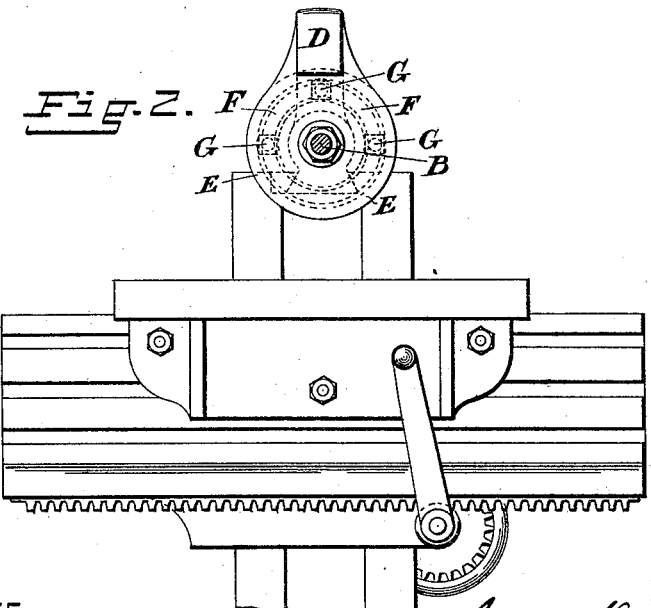

Figure 1 is a side view, partly in section, of such parts of a milling-machine as are necessary to show my invention, and Fig. 2 is an end view thereof taken on line *a b* of Fig. 1.

A represents the head-stock of the machine, supporting the cutter-spindle B, driven by gear-wheel C. The radial arm is shown at D, having a flange E, in which is formed an annular groove F. (Shown in dotted lines in Fig. 2.) Within the annular groove are the heads of three bolts G, which pass through holes formed in the flange H of the head-stock A, the two parts—that is to say, the head-stock and the radial arm—being held together by the bolts G and nuts I. It will therefore be understood by those conversant with mechanics that on the bolts G being slackened the radial arm D can be twisted or made to oscillate upon its fulcrum to any angle required to suit the class of work under operation. The front end of the cutter-spindle B is supported in the ordinary manner by the bracket J, so that when the radial arm is twisted the bracket J is carried with it, as will be well understood.

By the employment of the adjustable radial arm in milling-machines such machines can be adapted to do a class of work which hitherto they could not do, in addition to which the thrust upon the cutter-spindle will be partially borne by the radial arm, and not by the spindle alone, as is now the case.

I claim as my invention—

1. In a milling-machine, the combination, with a stationary head-stock for supporting one end of the cutting-arbor and provided with a flange, of a cranked arm for supporting the other end of the said arbor, provided with a flange adapted to be revolved in contact with the first said flange, and a bolt for connecting the said flanges together after the position of the cranked arm has been adjusted, substantially as set forth.

2. In a milling-machine, the combination, with a stationary head-stock provided with a flange, of a cranked arm for supporting the outer end of the cutting-arbor and provided with a flange having a circular recessed groove in it, and bolts fitting in holes in the flange on the head-stock and engaging with the said groove, whereby the cranked arm may be revolved to any desired position and secured by the said bolts, substantially as set forth.

In testimony whereof I affix my signature in presence of two witnesses.

JAMES HOLLINGWORTH.

Witnesses:
ED. HOLLINGWORTH,
  *Dobcross.*
DAVID J. DAILEY,
  *Solicitor, Huddersfield.*